May 14, 1968   J. R. GATELY   3,383,585
CURRENT CUTOFF CIRCUIT FOR REGULATED POWER SUPPLY
Filed July 26, 1965   3 Sheets-Sheet 1

INVENTOR.
JOSEPH R. GATELY
BY
Alfred W. Barber
ATTORNEY

May 14, 1968 J. R. GATELY 3,383,585
CURRENT CUTOFF CIRCUIT FOR REGULATED POWER SUPPLY
Filed July 26, 1965 3 Sheets-Sheet 2

INVENTOR.
JOSEPH R. GATELY
BY *Alfred W. Barber*
ATTORNEY

United States Patent Office

3,383,585
Patented May 14, 1968

1

3,383,585
CURRENT CUTOFF CIRCUIT FOR REGULATED
POWER SUPPLY
Joseph R. Gately, Woodside, N.Y., assignor to Forbro
Design Corp., New York, N.Y., a corporation of New
York
Filed July 26, 1965, Ser. No. 474,553
4 Claims. (Cl. 323—4)

ABSTRACT OF THE DISCLOSURE

The present invention provides current limiting in a voltage regulated power supply which under overload conditions causes the current to fold back so that the final current to a short circuit is very low and typically 5–10 percent of the maximum rated current of the supply. This is accomplished by comparing the voltage drop across a current sensing reistor with a portion of the voltage from the voltage regulating circuit and using the resultant to disable the output voltage control amplifier at an intermediate point in the amplifier.

---

The present invention concerns voltage regulated power supplies and, in particular, current cut-off methods and means in such a power supply under overload conditions.

The term "power supply" as used herein may be taken to mean a device or system for converting alternating current from a power line to direct current for operating electronic equipment and the like. The power supplies which are the subject of the present invention are of the type known as regulated i.e. circuit means are employed to control the output to keep it constant in spite of variations in the input alternating current voltage from the line and/or changes in the effective load impedance. These power supplies are also of the type known as programmable i.e. the output can be varied upon command by varying one or more of the circuit parameters. The regulating circuit of the present invention utilizes a control bridge the four arms of which include; a reference voltage source, a reference resistor (bridge current determining resistor), a voltage control resistor (which may be changed or varied to change or vary the output voltage of the power supply), and the output load. This bridge circuit provides an output (error signal) which when amplified in a high gain amplifier controls a series pass device (transistor or vacuum tube) in series with a source of unregulated voltage in such a way as to control the output voltage across the load resistor in accordance with the bridge constants. For further details of the operation of this basic circuit reference is made to U.S. Patent No. 3,028,538.

A regulated power supply such as the one briefly described above regulates to maintain the voltage across the load constant. However, if the load resistor is such that in order to maintain this regulated voltage, the power supply is called on to supply more than its rated current, i.e. if the power supply is over-loaded or shorted, damage may be done to the power supply circuitry especially the series pass device. Therefore, in this type of regulated power supply it is usual to provide some sort of current limiting circuitry which limits the maximum current which can be drawn under overload or short-circuit conditions. Generally these circuits start to operate at a point somewhat above the maximum rated current point of the power supply and, as the load resistance is decreased, reduced the voltage until at short circuit and zero output-voltage, a maximum current of 25 to 50 percent greater than rated current flows into the short circuit. Under this short circuit condition the series pass device must absorb all of

2 the voltage of the unregulated source at the maximum limiting current. The current limiting circuit may include a current sensing resistor in series with the output the voltage drop across which is compared with a fixed reference voltage. When the voltage drop across the current sensing resistor equals and starts to exceed the reference voltage, a signal is fed to the series pass device preventing it from passing more current.

It has been found in accordance with the present invention that if the reference voltage is not fixed but is a voltage which decreases as the output voltage decreases that the short circuit current can be made substantially less than the rated current of the power supply. Furthermore, it has been found in accordance with the present invention that, if the signal provided when the voltage across the sensing resistor exceeds the reference voltage is fed to a point in the error amplifier, that the current limiting circuit has greatly increased sensitivity and produces a much sharper current cut-off characteristic.

Accordingly, it is one object of the present invention to provide improved current limiting characteristics in a voltage regulated power supply.

A further object is to provide a current cut-off characteristic in a voltage regulated power supply whereby short-circuit current is reduced to a value far below the rated current of the power supply.

Still another object is to greatly reduce the power requirements of the series pass device under short-circuit conditions whereby fewer and less expensive series pass devices may be used with a given voltage and current rated power supply.

A still further object is to provide a current cut-off characteristic in a voltage regulated power supply which will remain cut-off until reset.

These and other objects of the present invention will be apparent from the detailed description of the invention given in connection with the various figures of the drawing.

Figure 1:
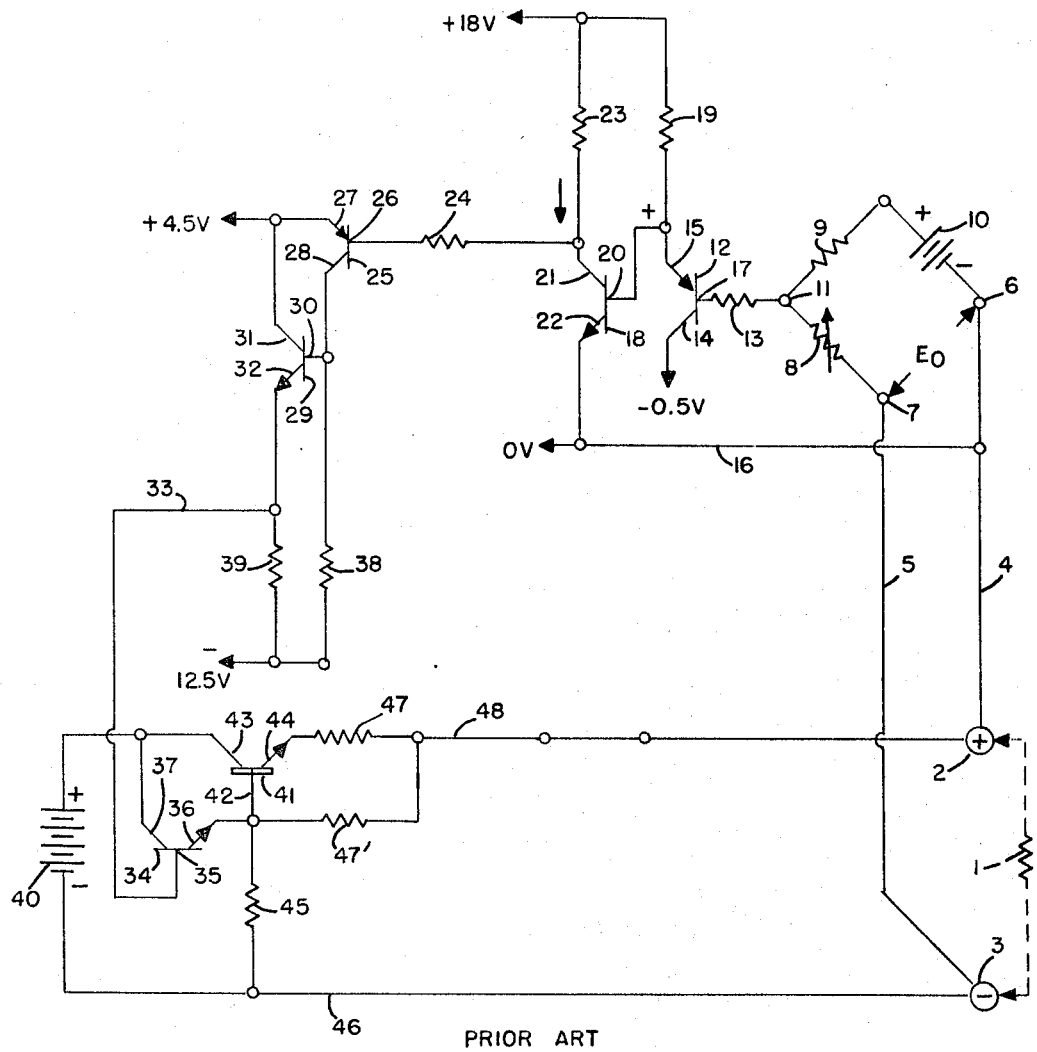
FIG. 1 is a simplified schematic of a prior art circuit to which the present invention can be applied.

In the prior art circuit of FIG. 1, the output voltage to be applied to load 1 appears across output terminals 2 and 3 which in turn are connected over leads 4 and 5 to terminals 6 and 7. The output voltage is designated as $E_0$. The control of the output voltage $E_0$ depends on dynamic balance in the bridge comprised of output voltage source $E_0$, output voltage control resistor 8, reference resistor 9 and reference voltage 10. (Reference is made to U.S. Patent No. 3,028,538 for a basic description of this type of control circuit.) Terminal 6 of the control bridge is connected to a zero voltage reference line 16 and diagonal terminal 11 is connected through a current limiting resistor 13 to base 17 of first amplifier stage transistor 12. This first stage transistor 12 is connected as an emitter follower to second transistor 18. Collector 14 is returned to an off-set voltage source of say −0.5 volt (not shown) and emitter 15 is returned through emitter resistor 19 to a source of positive bias +18 volts (not shown). Emitter 15 is directly connected to base 20 of second transistor 18. Emitter 22 is connected to the zero reference line 16 and collector 21 is connected through load resistor 23 to the +18 volt bias. Collector 21 is connected through resistor 24 to base 26 of the third amplifier transistor 25. Emitter 27 is connected to a source of bias +4.5 volts (not shown) which sets the level of the output on collector 28 when this transistor conducts. The fifth amplifier transistor 29 is connected with its base 30 connected to collector 28 and its collector 31 connected to emitter 27 and the +4.5 volt bias voltage. Emitter 32 is connected over line 33 to base 35 of driver transistor 34. Collector 28 and base 30 are returned to a source of −12.5 volts (not shown) through resistor 38 and emitter 32 and base 35 are returned to this same −12.5 volt source through resistor 39. Emitter 36 is connected to base 42 of series pass transistor 41. The source of unregulated voltage represented by battery 40 and to be controlled by series pass transistor 41 has its positive end connected to collector 43 and its negative end connected over return line 46 to negative output terminal 3. Collector 37 is returned to the positive end of the unregulated voltage source. Emitter 44 is connected through current limiting resistor 47 to the positive line 48 and positive load terminal 2. Base 42 is returned through resistor 45 to negative line 46 thereby providing cut-off bias in the absence of driving signals from transistor 34. The negative end of resistor 47 is returned through resistor 47' to base 42 to provide a conduction reducing signal in case of excessive load current.

Briefly, the operation of FIG. 1 is as follows: If the control bridge is unbalanced by excess output voltage (i.e. is calling for more current from the unregulated source 40 through the pass transistor 41), emitter 15 approaches the zero voltage. With emitter 15 approaching zero, base 20 will also approach zero and transistor 18 will conduct less. When transistor 18 reduces conduction, collector 21 will tend to go in a positive direction toward the +18 volt base and base 26 being pulled along with it, transistor 25 will reduce conduction. With transistor 25 conducting less, collector 28 and base 30 will be pulled negatively by the −12.5 volt source as well be emitter 32 and base 35 rendering transistors 29 and 34 less conductive. With less current flowing in transistor 35, base 42 will receive less current from emitter 36 and pass transistor 41 will reduce conduction.

On the other hand, when the control bridge is unbalanced by a condition calling for more current from source 40 through pass transistor 41, the conditions essentially reverse. Base 17 tends to go in a positive direction and emitter 15 following it will cause base 20 to go positive and transistor 18 to conduct more. This pulls collector 21 down toward zero and base 26 will go more negative referred to +4.5 volts causing transistor 25 to conduct more. Conduction of transistor 25 causes collector 28 to move up toward the +4.5 volt emitter voltage causing transistor 29 to conduct more. This will cause emitter 32 to move toward the +4.5 volt bias voltage carrying base 35 which in turn causes transistor 34 to conduct more and to supply current to base 42 of pass transistor 41. Current to base 42 causes pass transistor 41 to conduct more permitting more current to flow from source 40 to output line 48 which is the result called for by the unbalance condition of the control bridge.

In order to insure cutoff of the series pass transistor 41 when zero output voltage is called for, a negative bias is supplied through resistor 45 returned to the negative side of unregulated source 40 and across resistor 47 connected from base 42 to common line 48. Resistors 45 and 47 act as a voltage divider permitting applying the required negative cutoff bias while at the same time limiting the bias thus applied to a value which is safe for the transistor.

Figure 2:
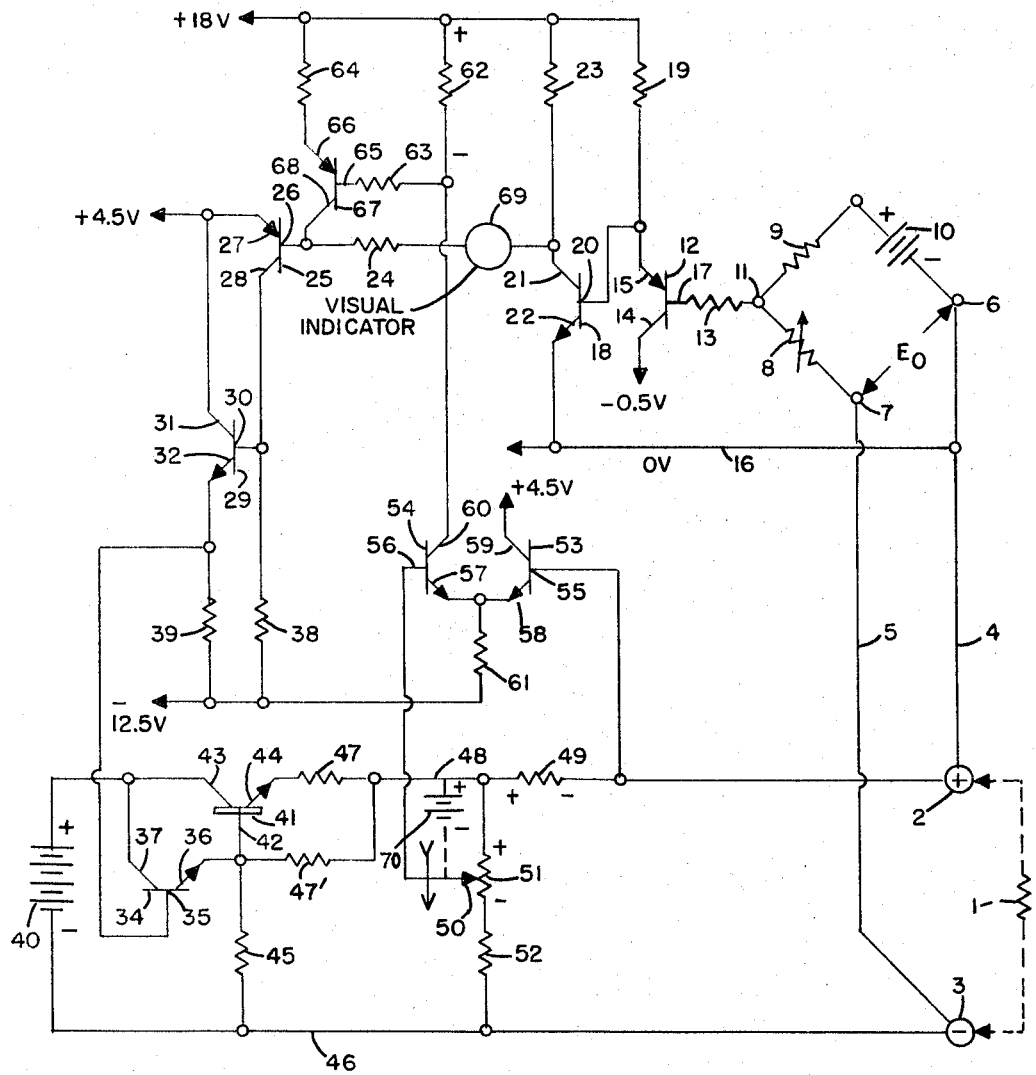
FIG. 2 is a simplified schematic of one form of the present invention as applied to the circuit of FIG. 1.

FIG. 2 repeats the prior art portion of the circuit with the changes which are in accordance with the present invention. The same numbers are used to indicate the components of FIG. 2 which correspond with those of FIG. 1 and which function in the same manner. The modification in accordance with the present invention provides means for automatically cutting off or reducing to a low value the output current when the output is overloaded or short-circuited. In order to carry out the operation of the present invention a voltage is generated proportional to the load current. This may conveniently consist of the voltage drop across resistor 49 placed in series with the output between the series pass transistor 41 and the positive output terminal 2. A second voltage is provided which is proportional to the output voltage. This may conveniently consist of the voltage drop between adjustable contact 50 on potentiometer 51 which in series with fixed resistor 52 is bridged across the output voltage source between the series pass transistor 41 and the positive output line 48 and terminal 3. The adjustment of adjustable contact 50 permits selecting a desired portion of the output voltage. The output current dependent drop across resistor 49 is compared with the output voltage dependent drop between contact 50 and common line 48 by applying them to a differential pair of transistors 53 and 54. Base 55 is connected to the output end of resistor 49 and base 56 is connected to adjustable contact (negative) 50. Emitters 57 and 58 are returned through a common emitter resistor 61 to a negative reference bias (−12.5 v.) with respect to common line 48. Collector 59 is returned to a positive bias (+4.5 v.) and collector 60 is returned through a collector load resistor 62 to the plus 18 volt bias source. The voltage drop across resistor 62 is applied through base resistor 63 and emitter resistor 64 to base 65 and emitter 66 respectively of transistor 67. Collector 68 is connected to base 26 of transistor 25, one of the error amplifier transistors.

In operation it will be seen that of transistor 53 and 54 only one will conduct at a time, as is characteristic of their different circuit connection with a common emitter resistor and the one which conducts will be the one with the more positive base bias voltage. When no output current is being drawn, only a small current, the bridge current, flows through resistor 49 and the voltage drop across it is very small. Since the voltage at contact 50 has been set to some predetermined value, base 56 will be more negative than base 55. In other ords, base 55 will be less negative (more positive) than base 56 and transistor 53 will conduct and transistor 54 will be cutoff. With transistor 54 cutoff, no current will flow in collector resistor 62 and no bias will be applied to base 65 of transistor 67 and it will remain cutoff and will have no effect on the normal operation of the error amplifier or the regulator as a whole.

When load current is drawn from the power supply, the voltage drop across resistor 49 (current sensing resistor) increases. The setting of adjustable contact 50 is chosen so that at some predetermined load current, the voltage across resistor 49 just equals the voltage from contact 50 to common line 48. Now, if the load resistance is decreased from the value drawing the chosen maximum load current, the drop across resistor 49 becomes greater than the voltage at contact 50 and the transistor 53 is cutoff and transistor 54 is turned on. The resulting current in resistor 62 provides a less negative bias to base 65 causing transistor 67 to conduct which in turn pulls base 26 in a positive direction tending to cut off transistor 25. Thus, base 26 may be considered a signal point carrying the signals to be amplified and at the same time this signal point is responsive to a gain control bias as supplied from collector 68. With transistor 25 conducting less the drive through transistors 29 and 34 to pass transistor 41 is reduced and the current to the load is reduced. Reduction of the load voltage reduces the voltage at contact 50 and the unbalance between transistors 53 and 54 is further increased. The system thus degenerates the output voltage still more until, under short-circuit conditions, the output voltage being zero the output current is also reduced to a very low value, typically about 5 percent of the chosen maximum operating current.

Figure 3:
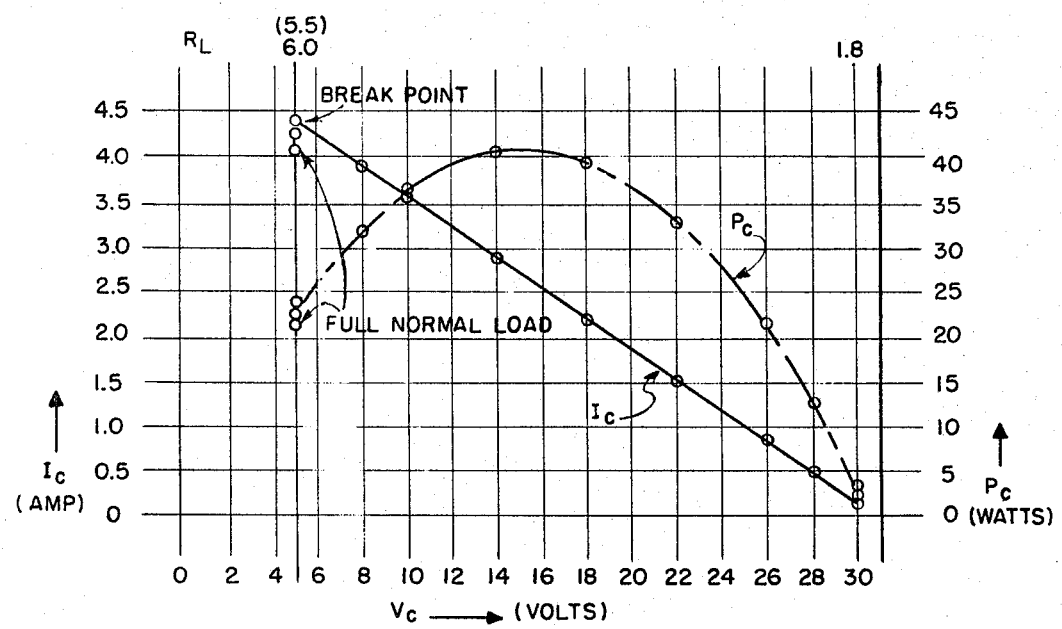
FIG. 3 is a graphic representation of the current and power dissipation in a typical series pass device of a circuit utilizing the present invention.

The operation of FIG. 2 described above can be illustrated graphically as in FIGS. 3 and 5. FIG. 3 shows two plots of current and voltage values illustrating the mode of operation of the present invention. The plot marked $I_c$ shows how the output current $I_c$ decreases as the load resistance $R_L$ is decreased from the "Break Point" resistance of about 6.00 ohms in the particular case illustrated where the full normal load current is 4.0 amperes down to about 0.2 ampere at a load resistance of 1.8 ohms. There will be a further slight decrease in output current as the load resistance is decreased to zero (short-circuit). The "Break Point" is the point at which the voltage drop across the current sensing resistor 49 is substantially equal to the set voltage between contact 50 and common line 48. Also on FIG. 3 is plotted the voltage across ($V_c$) and the power dissipated by ($P_c$) the series pass transistor as a function of the load resistance for the same overload conditions. At full normal load (6.00 ohms) the voltage across the series pass transistor ($V_c$) is approximately 5 volts and the dissipation in the series pass transistor is approximately 21 watts. As the load resistance is lowered, the voltage drop increases and the power dissipation maximizes at approximately a load resistance of 5.6 ohms, a voltage across the pass transistor of 15 volts and a dissipation in the pass transistor of 41.0 watts. As the load resistance is further decreased, the voltage drop increases but the power dissipation starts to decrease and decreases at an accelerating rate to reach a low value of the order of 3 watts at short-circuit. It should be noted that although as much as 41 watts must be dissipated by the pass transistor, this is only at a particular and substantially critical value of load resistance, a condition not likely to be encountered in a practical situation and a condition much less likely to be maintained for any extended period of time. It should also be noted that if the current were not caused to decrease, the power dissipation in the pass transistor would reach a value of 30 v.×4 amp.=120 watts under short-circuit conditions even if the current were sharply limited to the maximum rated value of 4 amperes.

Figure 5:
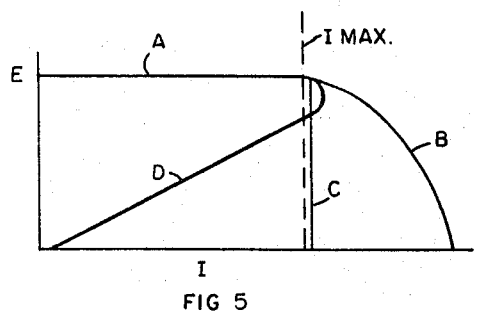
FIG. 5 is a graphic representation of the cut-off characteristic of a power supply in accordance with the present invention compared with two other possible current limiting characteristics.

FIG. 5 illustrates the operation of the present invention in comparison with two common types of current limiting characteristics. In this FIG. 5 the output voltage E is plotted against the output current I. Plot A illustrates a constant output voltage as the output current increases to some maximum preset value $I_{MAX}$. If an attempt is made to draw more current from the power supply, the voltage may decrease along a curve such as B. This type of current characteristic is generally called "current limiting" and the final current at $E=0$ (short-circuit) may be almost any value, typically 25 to 50 percent greater than $I_{MAX}$ and indicating a power dissipation in the series pass device of 50 to 150 percent more than would be required under any normal operating condition, say output voltage programmed to zero at maximum rated current.

Another type of current limiting is illustrated by curve C of FIG. 5 in which the current is very sharply limited at the $I_{MAX}$ current. This is often called an automatic crossover characteristic since the voltage is regulated at a constant value up to the $I_{MAX}$ point after which the current is regulated at a constant value. The maximum dissipation required in the series pass device in this case is equal to $I_{MAX}$ times the voltage brop across the series pass device, essentially the same dissipation as is required when ahe output voltage is programmed to zero at full output current. The present invention can be operated in this way by substituting a fixed reference voltage between common line 48 and transistor base 56 as suggested by the battery 70.

FIG. 5 also illustrates the path followed by the output voltage in a circuit in accordance with the current cutoff operation mode of the present invention as at D. After the critical maximum current point $I_{MAX}$ is reached both the output voltage and the output current decrease along line D until at short-circuit the output voltage becomes zero and the output current becomes some small value typically 5 percent of $I_{MAX}$.

Figure 4:
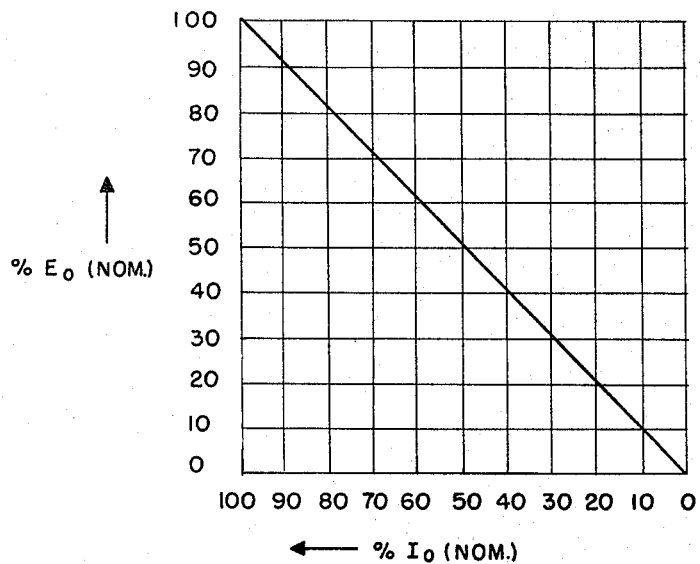
FIG. 4 is a graphic representation of the linear voltage vs. current derating characteristic of a power supply utilizing the present invention when such a power supply is programmed to operate at less than its rated maximum output voltage.

It has been found that a regulated power supply in accordance with the present invention can be operated as a programmed output voltage power supply as by varying resistor 8 in the bridge circuit. If the design has been made to provide the greatest economy in the series pass device, operation below the maximum rated output voltage must be carried out at a maximum current which is reduced linearly in the same proportion. This "derating" characteristic is shown in FIG. 4 where, for example, the power supply is rated at 100 percent maximum current at maximum rated voltage, 60 percent maximum current at 60 percent maximum voltage, etc. linearly down to zero. In order to provide current cutoff at any of these currents less than maximum, it is merely necessary to retard the position of contact 50 toward common line 48 to provide a proportionally reduced initial reference voltage to balance the reduced drop across current sensing resistor 49 called for by the reduced maximum current rating.

The sharpness of the current cutoff action of the circuit of the present invention depends on the gain between the voltage/current comparison points, the differential stage (transistors 53–54), the gain stage (transistor 67) and the error amplifier and series pass transistor from base 65 on. The fact that the circuit makes double use of at least a portion of the error amplifier increases reliability and saves components by requiring fewer stages in the cutoff control circuit. A range of gain can be provided by varying the values of emitter resistor 61 and collector load resistor 62. At one particular gain, the system will cutoff as shown in FIG. 3 and will automatically restore full output current if the load resistance is increased to the initial value of 6.05 ohms. However, by decreasing resistor 61 and increasing resistor 62, enough increased gain can be provided to cause a snap-action effect in which the current cuts off to a low value but does not come back automatically. In order to restore full current in such a circuit, the input to the power supply must be removed, the over current load restored to less than the critical value and the input power reapplied.

The value of resistor 24 in FIG. 2 must be chosen to permit base 26 to be pulled above the +4.5 volt value even though transistor 18 is clamping collector 21 to 0 volts. When the circuit acts causing transistor 67 to conduct, current will flow in resistor 24 due to this differential pull and this fact may be utilized to advantage by placing an indicator 69 in series with it. The device 69 may be a visual indicator such as a lamp or a vane type indicator or it may be a relay coil actuating almost any type of indicating circuit or a control device.

While only one form of the present invention has been shown and described in detail, many modifications will be apparent to those skilled in the art and within the spirit and scope of the invention as set forth, in particular, in the appended claims.

What is claimed is:

1. In a regulated power supply, the combination of: a reference bridge including an arm containing a reference voltage source and a current determining resistor and an arm containing a variable voltage control resistor and a pair of output terminals for connection to a load to be supplied with regulated voltage; a source of direct current voltage to be regulated; two paths from said source to said output terminals, one of which is direct and the other of which passes through a current control device, and a current sensing resistor in that order; an amplifier connected between said bridge and said current control device for maintaining the voltage across said terminals substantially equal to the voltage across said variable voltage control resistor; wherein said amplifier includes at least two cascaded transistor stages including a signal point therebetween; means for comparing the voltage drop across said current sensing resistor with a portion of the voltage between said direct path and said path passing through said current control device at a point between said current control device and said current sensing resistor comprising a differentially connected pair of transistors to provide a conductive circuit in response to a voltage drop across said sensing resistor greater than said portional voltage; and a connection between said conductive circuit and said point to suppress amplification in said stages upon conduction of said conductive circuit.

2. A regulated power supply as set forth in claim 1 wherein said connection includes the collector to emitter path of a transistor.

3. A regulated power supply as set forth in claim 1 wherein said transistor stages include a circuit including a current indicator coupled to said conductive circuit and indicating the conductive state of said circuit.

4. In a regulated power supply as set forth in claim 1 wherein said cascaded stages include a path from the collector of one transistor to the base of another transistor, a visual indicator in said path and wherein said conductive circuit is connected to said base.

References Cited

UNITED STATES PATENTS

| | | | |
|---|---|---|---|
| 2,551,407 | 5/1951 | Alder | 323—4 |
| 3,284,692 | 11/1966 | Gautherin | 323—22 |
| 3,303,411 | 2/1967 | Gately | 323—4 |
| 3,303,412 | 2/1967 | Gately | 323—4 |
| 3,324,378 | 6/1967 | Kupferberg | 323—9 X |

JOHN F. COUCH, *Primary Examiner.*

A. D. BELLINEN, *Assistant Examiner.*